(12) United States Patent
Do et al.

(10) Patent No.: US 8,547,978 B2
(45) Date of Patent: Oct. 1, 2013

(54) METHOD FOR PROVIDING MBS SERVICE IN A WAN NETWORK, AND SYSTEM THEREOF

(75) Inventors: Mi-Sun Do, Suwon-si (KR);
Seung-Mok Shin, Seoul (KR);
Jang-Woo Son, Seoul (KR); Jong-Ho Bang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 11/772,530

(22) Filed: Jul. 2, 2007

(65) Prior Publication Data
US 2008/0123543 A1    May 29, 2008

(30) Foreign Application Priority Data

Jul. 1, 2006    (KR) ................. 10-2006-0061722

(51) Int. Cl.
*H04L 12/28*    (2006.01)
(52) U.S. Cl.
USPC ........................................... 370/390
(58) Field of Classification Search
USPC ........................................... 370/390
See application file for complete search history.

(56) References Cited

U.S. PATENT DOCUMENTS

| | | | |
|---|---|---|---|
| 6,745,246 B1 * | 6/2004 | Erimli et al. ................. | 709/238 |
| 7,457,541 B2 | 11/2008 | Koh et al. | |
| 7,571,238 B1 * | 8/2009 | Reeves et al. ................. | 709/229 |
| 7,907,952 B2 | 3/2011 | Lee et al. | |
| 8,140,054 B2 | 3/2012 | Park et al. | |
| 2002/0091926 A1 | 7/2002 | Fukutomi | |
| 2006/0002383 A1 * | 1/2006 | Jeong et al. ................. | 370/360 |
| 2006/0089127 A1 * | 4/2006 | Muratsu ..................... | 455/411 |
| 2006/0227747 A1 * | 10/2006 | Kim et al. ................... | 370/331 |
| 2008/0095119 A1 * | 4/2008 | Bachmann et al. .......... | 370/332 |

FOREIGN PATENT DOCUMENTS

| | | |
|---|---|---|
| JP | 2003-158547 A | 5/2003 |
| KR | 10-2005-0019397 | 3/2005 |
| KR | 10-2005-0041864 A | 5/2005 |
| KR | 10-2005-0053857 A | 6/2005 |
| KR | 10-2005-0076921 | 7/2005 |
| KR | 10-0506284 | 8/2005 |
| KR | 10-2005-0109685 A | 11/2005 |
| KR | 10-2006-0038720 | 5/2006 |

OTHER PUBLICATIONS

Multimedia Broadcast/Multicast Service (MBMS) Architecture and Functional Description (Release 6), Mar. 2005, to 3rd Generation Partnership Project TS23.246 V6.6.0.*
Multimedia Broadcast/Multicast Service (MBMS) Architecture and Functional Description (Release 6), Mar. 2005, to 3rd Generation Partnership Project TS23.246 V6.6.0 (3GPP).*
Korean Office Action issued Sep. 13, 2012 in counterpart Korean Patent Application No. 10-2006-0061722 (5 pages, in Korean).

* cited by examiner

*Primary Examiner* — Ayaz Sheikh
*Assistant Examiner* — Hai-Chang Hsiung
(74) *Attorney, Agent, or Firm* — NSIP Law (57) ABSTRACT

A system and method for providing Multicast/Broadcast Service (MBS) service to a mobile terminal in an MBS service provisioning system in a Wide Area Network (WAN) network are provided. An authentication server sends a message for requesting resource reservation, in which a Quality-of-Service (QoS) policy is included, when a registration procedure of the mobile terminal is performed. A base station stores the message sent from the authentication server, forwards the message to the mobile terminal, and sets up a channel to the mobile terminal upon receiving from the mobile terminal a request for channel setup based on the QoS policy.

15 Claims, 4 Drawing Sheets

METHOD FOR PROVIDING MBS SERVICE IN A WAN NETWORK, AND SYSTEM THEREOF

CROSS-REFERENCE TO RELATED APPLICATION

This application claims the benefit under 35 U.S.C. §119(a) of a Korean Patent Application filed in the Korean Intellectual Property Office on Jul. 1, 2006 and assigned Serial No. 2006-61722, the disclosure of which is hereby incorporated by reference.

BACKGROUND OF THE INVENTION

1. Field of the Invention

The present invention relates generally to a method for providing Multicast/Broadcast Service (MBS) service in a Wide Area Network (WAN) network. More particularly, the present invention relates to a Quality-of-Service (QoS) provisioning and channel authentication method for MBS service in a WAN network, and a system thereof.

2. Description of the Related Art

Generally, mobile networks can be classified into a Local Area Network (LAN) network and a Wide Area Network (WAN) network according to size of the coverage areas. The LAN network is typically defined by IEEE 802.11, and the WAN network is typically defined by IEEE 802.16. The WAN network can include Wireless Broadband (WiBro) network, Worldwide Interoperability for Microwave Access (WiMAX) network, and the like.

The LAN network provides a data communication scheme that enables wireless communication within a short range from a fixed Access Point (AP). This network merely supports wireless local data communication rather than providing mobility of users.

However, the WAN network guarantees mobility of a user even when the user in a cell managed by an arbitrary base station moves to a cell managed by another base station. Taking the mobility of the user into account, the WAN network can provide a seamless data communication service.

The services provided by the WAN network are changing from the old voice-oriented service to new multimedia services including MBS service. The WAN network, compared with the existing mobile network, can provide broadband service, and needs to support real-time services even while the user is moving.

Generally, the MBS service provided by the WAN network is a real-time service, and includes Internet Protocol Television (IP-TV) service, and Radio service.

In a procedure for providing MBS service in the WAN network, a user desiring to receive MBS service accesses the WAN network through a predetermined authentication procedure.

When the user accesses the WAN network, provisioning connection is established between the user and the WAN network. The establishment of the provisioning connection is for transmission of a multicast control message by the user. The multicast control message may include an Internet Group Management Protocol (IGMP) message, a Multicast Listener Discovery (MLD) message, and the like.

The user, if he/she desires to receive MBS service, sends a multicast control message for requesting provision of the desired MBS service to the WAN network over the established provisioning connection. Upon receipt of the multicast control message for requesting MBS service from the user, the WAN network establishes dynamic MBS connection, and provides MBS service for the user over the established dynamic MBS connection, that is, transmits MBS-based multicast data streams over the established dynamic MBS connection.

The user, if he/she desires to terminate the ongoing service, sends a multicast control message for requesting termination of the MBS service over the provisioning connection. Upon receipt of the multicast control message for requesting termination of the MBS service from the user, the WAN network terminates the transmission of the multicast data streams being transmitted over the dynamic MBS connection.

The existing WAN network, operating in the manner described above, standardizes a Media Access Control (MAC) layer of a wireless link for real-time MBS service.

However, the existing WAN network provides no scheme for maintaining QoS of the multicast control message. That is, the WAN network provides no procedure for guaranteeing lossless transmission of the multicast control message. Accordingly, when a multicast control message is allocated for multicast-only connection, there is always a possibility that the multicast control message will be lost in the wireless link.

In addition, the existing WAN network provides only the authentication scheme for access to the WAN network, but provides no separate channel authentication scheme for MBS service, and simply provides MBS service to all users who have requested the MBS service. That is, MBS service that needs separate accounting (or billing) for its use may be provided to the users without limitation, thus making it impossible to form a paid broadcast channel with MBS service.

Further, when the users request MBS service by different IP multicast addresses, an authentication server should establish a connection to a mobile terminal separately for an individual multicast data stream associated with each MBS service, causing a loss of the limited wireless resources and a waste of resources in the wired link.

Accordingly, there is a need for an improved system and method for providing MBS service in a WAN network that performs separate channel authentication on a MBS service and reliably transmits a multicast control message.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a system for providing MBS service to a mobile terminal in an MBS service provisioning system in a WAN network.

Another aspect of exemplary embodiments of the present invention is to provide a method for providing MBS service to a mobile terminal in a MBS service provisioning system in a WAN network.

A further aspect of exemplary embodiments of the present invention is to provide a system for providing MBS service in a WAN network.

Still another aspect of exemplary embodiments of the present invention is to provide a method for providing MBS service in a WAN network.

An aspect of exemplary embodiments of the present invention is to provide a mobile terminal to which MBS service is provided, in a WAN network.

Another aspect of exemplary embodiments of the present invention is to provide a method for connecting a channel of a mobile terminal to which MBS service is provided, in a WAN network.

Still another aspect of exemplary embodiments of the present invention is to provide a QoS provisioning and channel authentication method for MBS service in a WAN network.

A further aspect of exemplary embodiments of the present invention is to provide a channel authentication method for providing a short channel change time for MBS service in a WAN network.

An aspect of exemplary embodiments of the present invention is to provide a method for provisioning QoS for a multicast control message for stable MBS service in a WAN network.

According to one aspect of exemplary embodiments of the present invention, there is provided a system for providing Multicast/Broadcast Service (MBS) service to a mobile terminal in an MBS service provisioning system in a Wide Area Network (WAN) network. The system includes an authentication server for sending a message for requesting resource reservation, in which a Quality-of-Service (QoS) policy is included, when a registration procedure of the mobile terminal is performed, and a base station for storing the message sent from the authentication server, forwarding the message to the mobile terminal, and setting up a channel to the mobile terminal upon receiving from the mobile terminal a request for channel setup based on the QoS policy.

According to another aspect of exemplary embodiments of the present invention, there is provided a method for providing Multicast/Broadcast Service (MBS) service to a mobile terminal in an MBS service provisioning system in a Wide Area Network (WAN) network. The method includes sending, by an authentication server, a message for requesting resource reservation, in which a Quality-of-Service (QoS) policy is included, when a registration procedure of the mobile terminal is performed, storing, by a base station, the message, and forwarding the message to the mobile terminal, and setting up a channel to the mobile terminal upon receiving from the mobile terminal a request for channel setup based on the QoS policy.

According to a further aspect of exemplary embodiments of the present invention, there is provided a system for providing Multicast/Broadcast Service (MBS) service in a Wide Area Network (WAN) network. The system includes a mobile terminal for, upon receipt of a message with a Quality-of-Service (QoS) policy from a base station, storing the received message, and sending a request for channel setup to the base station using the QoS policy when the mobile terminal desires to receive MBS service, and the base station for performing authentication of the mobile terminal upon receipt of the request for channel setup from the mobile terminal, and transmitting multicast data streams associated with the MBS service requested by the mobile terminal when the authentication is made successfully.

According to yet another aspect of exemplary embodiments of the present invention, there is provided a method for providing Multicast/Broadcast Service (MBS) service in a Wide Area Network (WAN) network. The method includes upon receipt of a message with a Quality-of-Service (QoS) policy from a base station, storing, by a mobile terminal, the received message, sending, by the mobile terminal, a request for channel setup to the base station using the QoS policy when the mobile terminal desires to receive MBS service, performing, by the base station, authentication of the mobile terminal upon receipt of the request for channel setup from the mobile terminal, and transmitting, by the base station, multicast data streams associated with the MBS service requested by the mobile terminal when the authentication of the mobile terminal is made successfully.

According to still another aspect of exemplary embodiments of the present invention, there is provided a mobile terminal for providing Multicast/Broadcast Service (MBS) service in a Wide Area Network (WAN) network. The mobile terminal includes a scheduler for, upon receipt of a message with a Quality-of-Service (QoS) policy from a base station, sending a response to the received message to the base station, and setting up a channel to the base station, and a controller for controlling transmission of a multicast control message to the base station over the set channel.

According to still another aspect of exemplary embodiments of the present invention, there is provided a channel connection method of a mobile terminal for providing Multicast/Broadcast Service (MBS) service in a Wide Area Network (WAN) network. The channel connection method includes upon receipt of a message with a Quality-of-Service (QoS) policy from a base station, storing the received message, sending a response to the received message to the base station, and setting up a channel to the base station, and transmitting a multicast control message to the base station over the set channel.

BRIEF DESCRIPTION OF THE DRAWINGS

The above and other aspects, features and advantages of certain exemplary embodiments of the present invention will be more apparent from the following detailed description taken in conjunction with the accompanying drawings in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

A detailed description will be made herein of a scheme for provisioning QoS for a multicast control message, and a service authentication scheme for MBS service.

The scheme for provisioning QoS for a multicast control message, allows a WAN network and a user to share a QoS policy for stably sending the multicast control message. An exemplary configuration of the QoS policy will be described below.

The service authentication scheme for MBS service allows a WAN network to share an MBS filter corresponding to authentication information for MBS service. The MBS filter includes information on a type of receivable MBS service separately for each individual user. In other words, the MBS filter includes information necessary for handling a request (for example, channel selection or channel change) for MBS service by a MBS subscriber, if any. This MBS filter is stored in a subscriber database (DB), and when a mobile terminal completes its registration in a mobile network, an authentication server extracts MBS filter information from the subscriber DB, and transmits the extracted MBS filter information to a relay station using a resource reservation request message. An exemplary structure of the MBS filter will be described below.

A detailed description of exemplary embodiments of the present invention will now be made herein with reference to the accompanying drawings.

Figure 1:
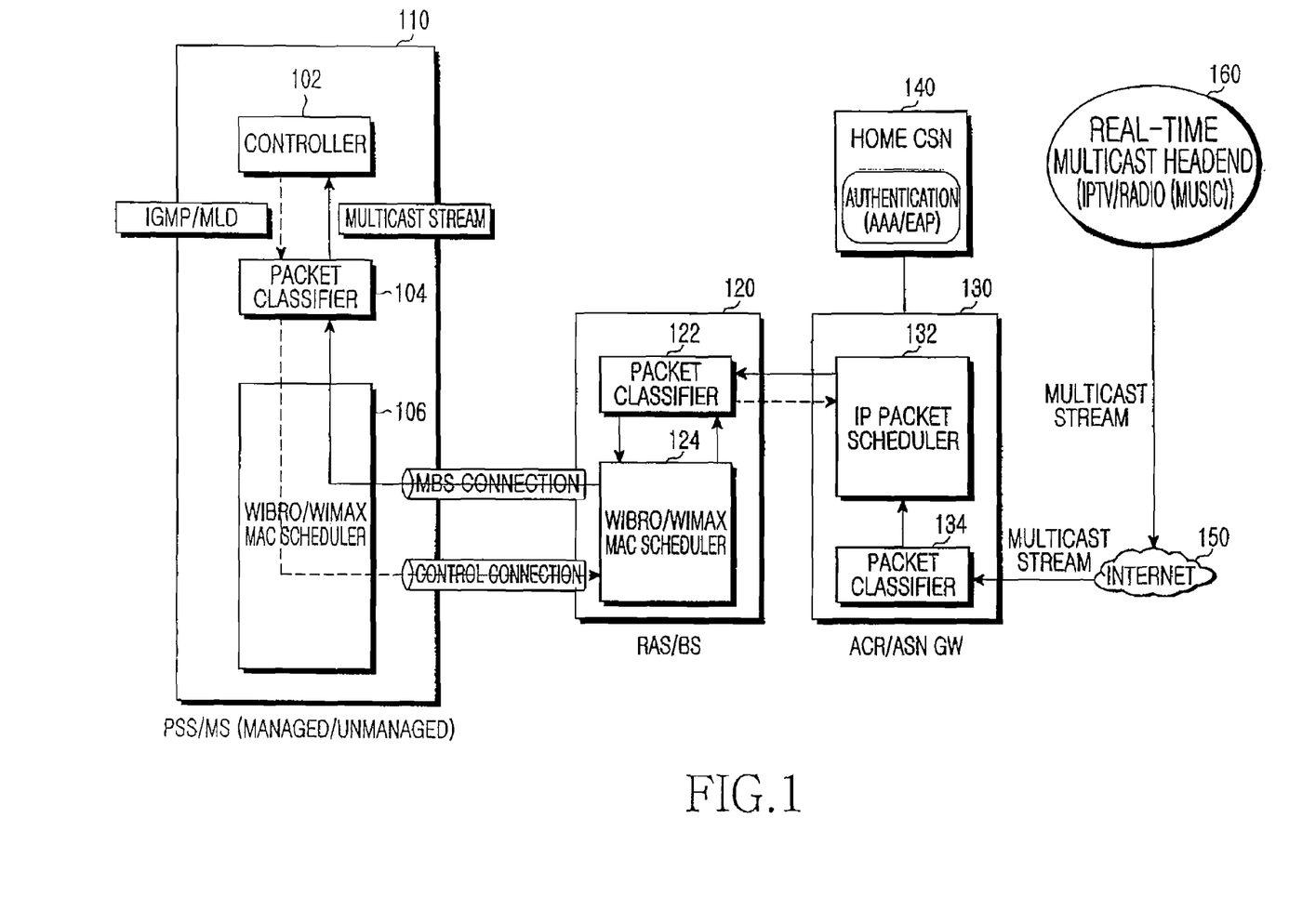
FIG. 1 is a diagram showing an example of a WAN network to which an exemplary embodiment of the present invention is applicable.
Figure 2:
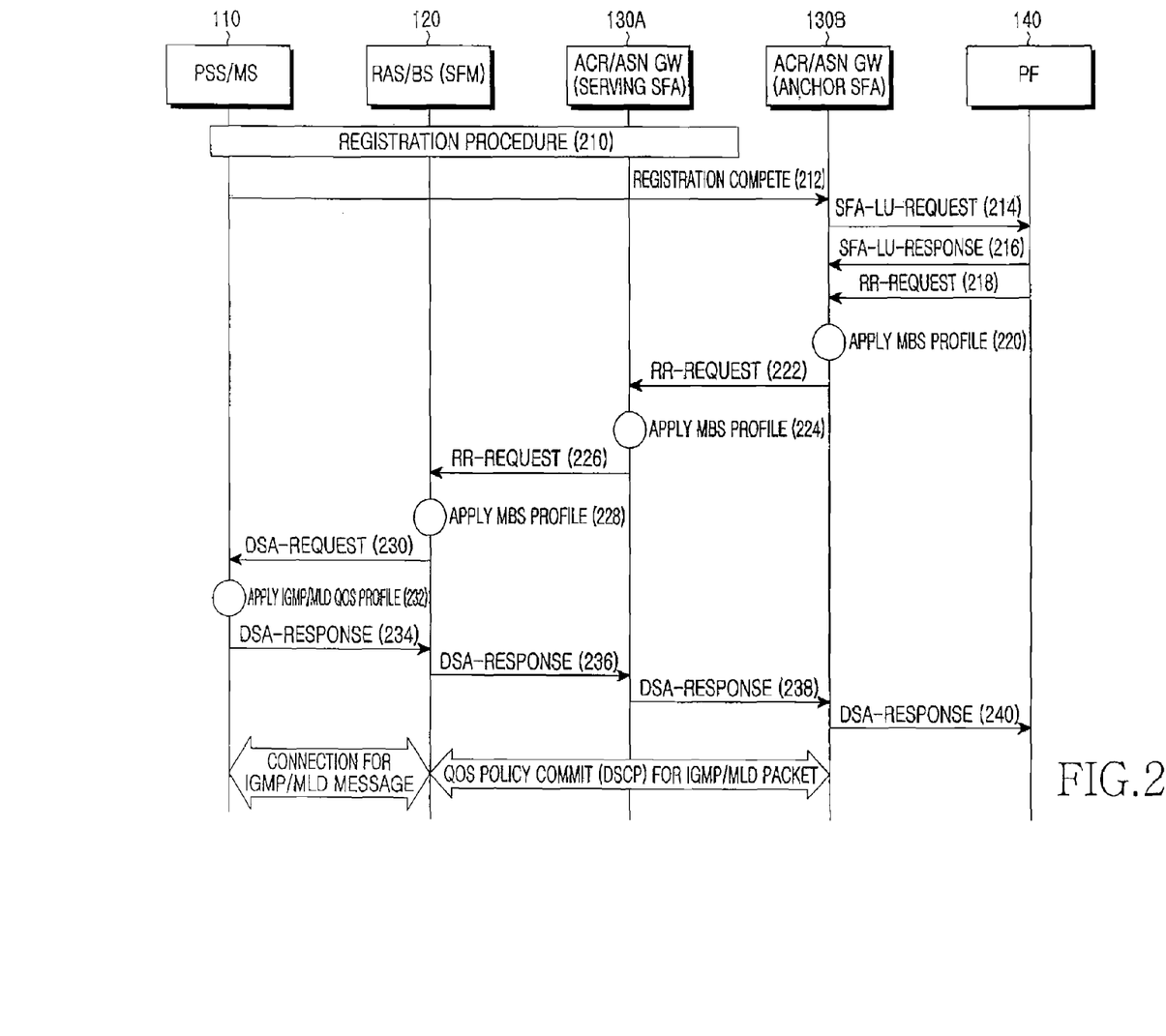
FIG. 2 is a diagram showing signaling for provisioning QoS for a multicast control message in a WAN network according to an exemplary embodiment of the present invention.
Figure 3:
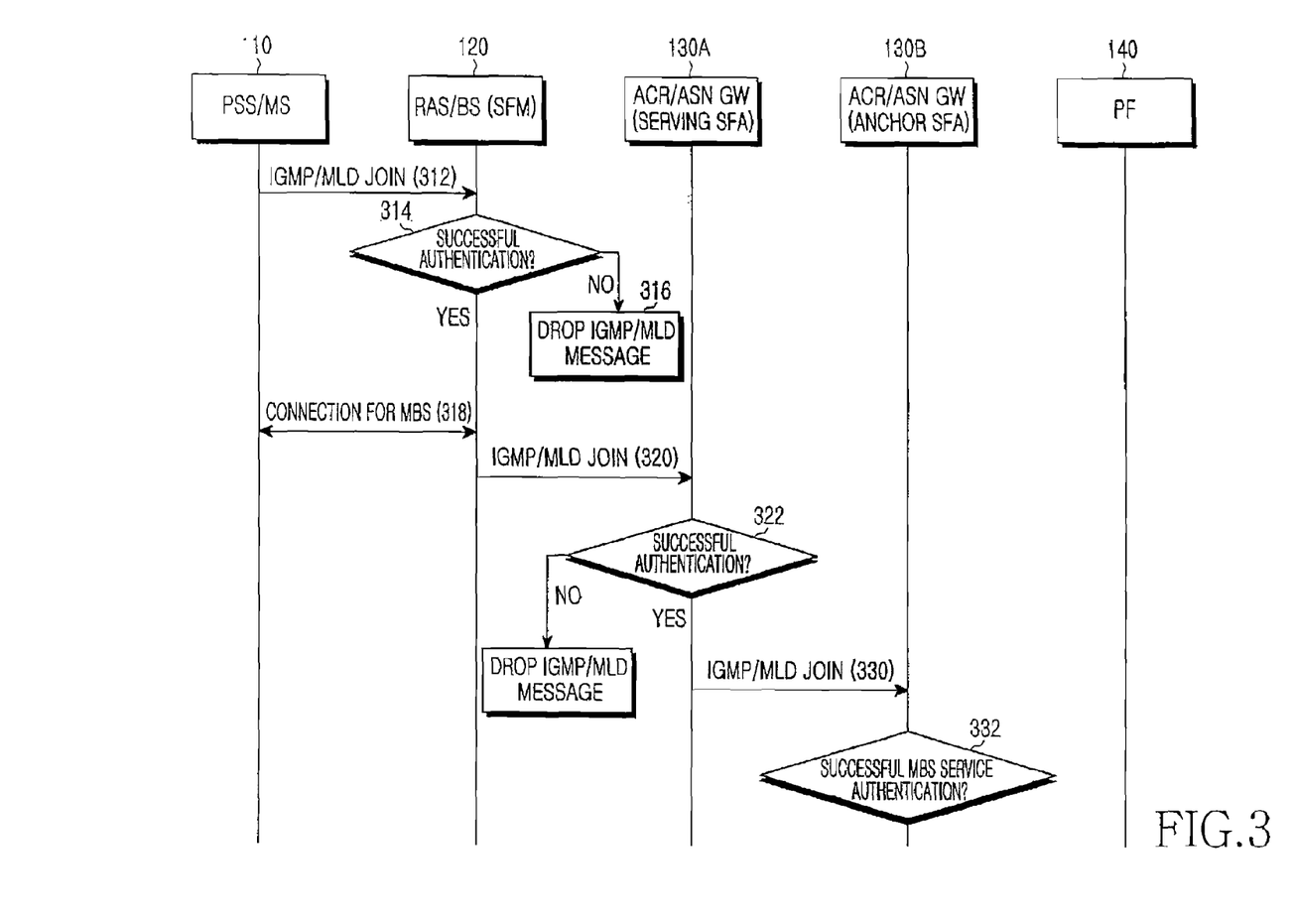
FIG. 3 is a diagram showing signaling for service authentication for MBS service in a WAN network according to an exemplary embodiment of the present invention.
Figure 4:
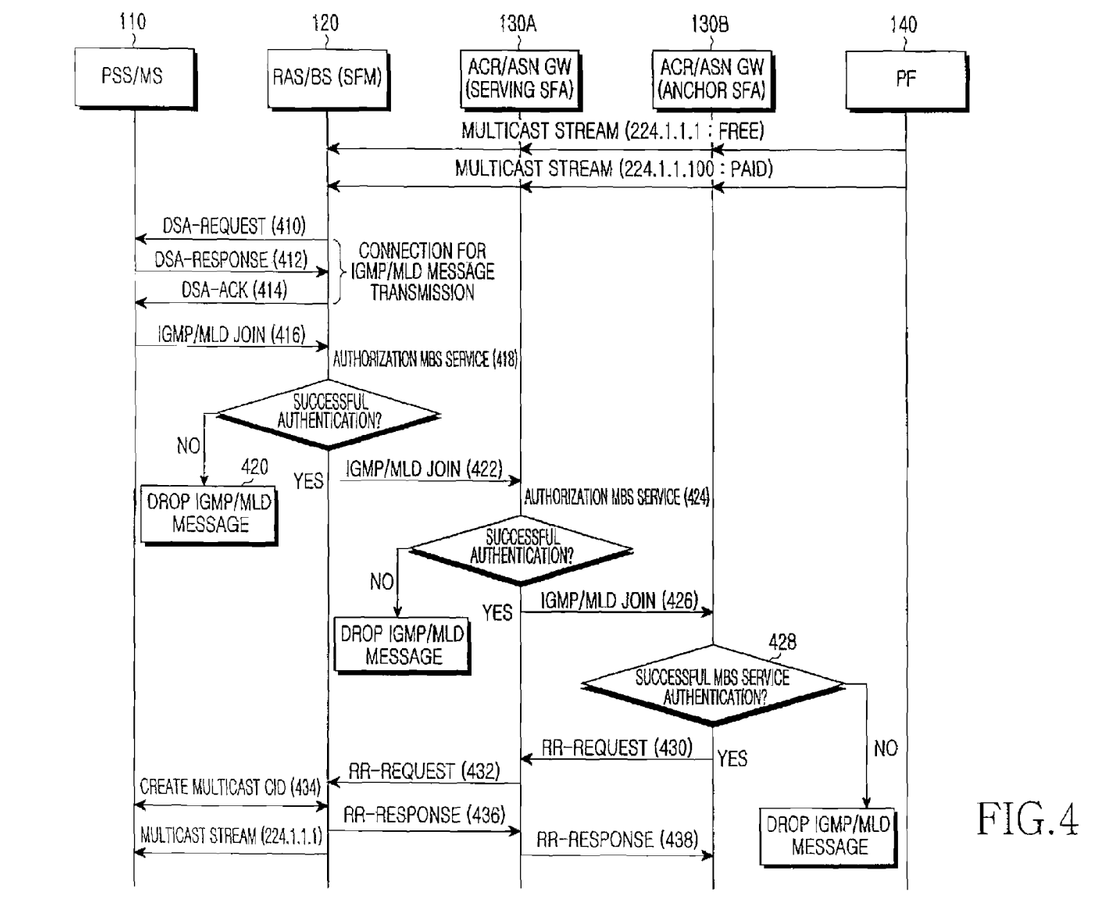
FIG. 4 is a diagram showing the entire signaling for providing MBS service in a fixed-mobile network according to an exemplary embodiment of the present invention.

FIG. 1 is a diagram showing an example of a WAN network to which an exemplary embodiment of the present invention is applicable. FIG. 1 is composed of a WAN network, a mobile terminal (PSS/MT) 110, and a multicast server (Real-time Multicast Headend) 160, and the WAN network is composed of a base station (RAS/BS) 120 that includes a packet classifier 122 and a scheduler 124, a relay station (ACR/ASN GW) 130 that includes an IP packet scheduler 132 and a packet classifier 134, and an authentication server (Home CSN) 140. The mobile terminal 110, the base station 120, and the relay station 130 each include a packet classifier and a MAC scheduler. Although it is assumed in FIG. 1 that only one relay station is provided, it would be obvious to those skilled in the art that the WAN network can include a plurality of relay stations 130a and 130b, as shown in FIGS. 2, 3 and 4.

Referring to FIG. 1, the mobile terminal (PSS/MT) 110 includes a controller 102, a packet classifier 104, and a scheduler 106. The scheduler 106, under the control of the controller 102, performs a registration procedure to the WAN network. After performing the registration procedure, the scheduler 106 stores a resource reservation request message received from the WAN network. The resource reservation request message includes pre-provisioned QoS parameters, and IGMP/MLD QoS policy. The IGMP/MLD QoS policy indicates any one of Best-Effort (BE), Expedited-Forwarding (EF), and Assured Forwarding (AF), by which it will provide the service. The scheduler 106 establishes a connection used for sending a multicast control message to the WAN network. The mobile terminal 110, when it desires MBS service, sends a multicast control message for requesting MBS service to the WAN network over a previously established connection. Upon receiving from the WAN network a message indicating a success in service authentication for the corresponding MBS service, the controller 102 controls the scheduler 106 to set up a connection used for receiving a data stream (or data streams) associated with the MBS service from the base station 120, and receives a multicast data stream transmitted from the WAN network over the set connection. The mobile terminal 110 desires to terminate the ongoing MBS service, the controller 102 sends a multicast control message for requesting release of the MBS service to the WAN network.

The base station 120 performs a registration procedure at the request of the mobile terminal 110, and stores a resource reservation request message received from the authentication server 140 according to the registration procedure. The resource reservation request message includes information on pre-provisioned QoS parameters, IGMP/MLD QoS policy, and the MBS filter. Thereafter, upon receiving from the mobile terminal 110 a setup request for a connection for transmission of a multicast control message, the base station 120 sets up a connection to the mobile terminal 110 by the QoS policy. Upon receipt of a multicast control message from the mobile terminal 110 over the set connection, the base station 120 forwards the multicast control message to the relay station 130, and performs service authentication on the MBS service requested by the mobile terminal 110 according to the multicast control message. If the base station 120 fails in the service authentication on the requested MBS service, it discards the corresponding multicast control message. However, if the base station 120 succeeds in the service authentication on the requested MBS service, it sends a multicast data stream corresponding to the requested MBS service. The base station 120, before transmission of the multicast data stream, sets up a connection for the transmission of the multicast data stream.

The relay station 130 stores information on the QoS policy and the MBS filter, provided from the authentication server 140 after the registration procedure on the mobile terminal 110 is completed. Upon receipt of a request message for MBS service from the base station 120, the relay station 130 performs service authentication on the MBS service. The relay station 130 receives a data stream for each individual MBS service from the multicast server 160 via the Internet 150, and transmits the received data stream for each individual MBS service to the base station 120.

FIG. 2 shows signaling for provisioning QoS for a multicast control message in a WAN network according to an exemplary embodiment of the present invention. It is assumed in FIG. 2 that two relay stations are provided. In the following description, one of the two relay stations is called a serving relay station (Serving Service Flow Authorization or Serving SFA), and the other is called an anchor relay station (Anchor SFA).

Referring to FIG. 2, a mobile terminal 110 performs a registration procedure to a WAN network in step 210. The registration procedure is a procedure that the mobile terminal 110 performs to initially access the WAN network.

After completion of the registration procedure, the mobile terminal 110 reports the completion of the registration procedure to an anchor relay station 130B in step 212. The anchor relay station 130B sends a relay station location update request message (SFA-Location Update-Request Message or SFA-LU-REQUEST Message) to an authentication server (PF) 140 in step 214. The SFA-LU-REQUEST message is a request message for location update of the relay station. The authentication server sends an SFA-LU-RESPONSE message to the anchor relay station 130B in response to the SFA-LU-REQUEST message in step 216.

The authentication server (PF) 140 sends a resource reservation request message (Resource Reservation-Request Message, or RR-REQUEST Message) to the anchor relay station 130B in step 218. The resource reservation request message includes QoS policy, pre-provisioned QoS parameters, and IGMP/MLD QoS policy. The pre-provisioned QoS parameters, when the mobile terminal reports its own location to the authentication server after completion of the mobile network registration, are QoS parameters applied to the channel connection/session over which the mobile terminal 110 will send messages for MBS service (that is, IGMP or MLD messages), if it is a MBS subscriber. The IGMP/MLD QoS policy determines a method by which it will provision QoS during transmission of an IGMP/MLD message. This IGMP/MLD QoS policy is composed of a wireless link-level QoS provisioning method applied in the 802.16e interface and a packet-level QoS provisioning method (for example, EF, AF, and BE) applied in the IP network. The QoS policy is information used for stably sending the multicast control message.

The anchor relay station 130B stores the QoS policy provided from the authentication server (PF) 140 in step 220, and sends a RR-REQUEST message to a serving relay station 130A in step 222. The RR-REQUEST message sent by the anchor relay station 130B includes the same information as that included in the RR-REQUEST message received from the authentication server (PF) 140.

The serving relay station 130A stores the QoS policy provided from the anchor relay station 130B in step 224, and sends an RR-REQUEST message to a base station 120 in step 226. The RR-REQUEST message sent by the serving relay station 130A includes the same information as that included in the RR-REQUEST message received from the anchor relay station 130B.

The base station 120 stores the QoS policy provided from the serving relay station 130A in step 228, and sends a dynamic service addition request message (Dynamic Service Addition-Request Message, or DSA-REQUEST Message) for requesting connection setup, to the mobile terminal 110 in step 230. The DSA-REQUEST message sent by the base station 120, a modification of the RR-REQUEST message received from the serving relay station 130A, includes the same information as that included in the RR-REQUEST message.

The mobile terminal 110 stores the QoS policy provided from the base station 120 in step 232, and sends a dynamic service addition response message (Dynamic Service Addition-Response Message, or DSA-RESPONSE Message) for requesting connection setup, to the base station 120 in step 234. The base station 120 forwards the DSA-RESPONSE message to the serving relay station 130A in step 236 and the serving relay station 130A forwards the DSA-RESPONSE message to the anchor relay station 130B in step 238. The anchor relay station 130B forwards the DSA-RESPONSE message to the authentication server (PF) 140 in step 240.

At the time that the registration procedure of the mobile terminal 110 is completed, the authentication server (PF) 140 provides the QoS policy to the anchor relay station 130B. The anchor relay station 130B propagates the QoS policy provided from the authentication server (PF) 140 to the serving relay station 130A, the base station 120 and the mobile terminal 110.

After the propagation of the QoS policy is completed, the mobile terminal 110, if it desires MBS service, sends a multicast control message (for example, IGMP/MLD message) for requesting MBS service. For transmission of the multicast control message, there is a need to set up a separate connection. The transmission of the multicast control message over a connection can be classified into transmissions over pre-provisioned connection, provisioning connection, dynamic connection, and MAC management Connection Identifier (CID).

In the transmission of the multicast control message over the pre-provisioned connection, there is a possible loss of the multicast control message. In the transmission of the multicast control message over the provisioning connection, there is a need to set up a separate provisioning connection after performing registration on the mobile terminal supporting MBS service.

In the transmission of the multicast control message over the dynamic connection, the mobile terminal 110 or the base station 120 sets up a dynamic connection if a situation happens in which there is a need to send the multicast control message. If there is no transmission of the multicast control message until a lapse of a time set by a dynamic timer, the dynamic connection is removed.

In the transmission of the multicast control message over the MAC management CID, a MAC management message to be used as the multicast control message is newly defined. The newly defined MAC management message is sent as the MAC management CID. For example, a Trivial File Transfer Protocol (TFTP) completion message based on primary management CID can be used.

FIG. 3 shows signaling for service authentication for MBS service in a WAN network according to an exemplary embodiment of the present invention. It is assumed in FIG. 3 that two relay stations are provided, and the MBS filter (IGMP/MLD Join filter) is already shared by the signaling shown in FIG. 2 in the WAN network.

The service authentication proposed in FIG. 3 is achieved by a procedure in which an anchor relay station 130B receives an MBS filter corresponding to MBS authentication information from an authentication server (PF) 140, and propagates the received MBS filter (IGMP/MLD Join filter) to a serving relay station 130A and a base station 120. The MBS filter (IGMP/MLD Join filter) includes information on a type of MBS service receivable at each mobile terminal.

For example, the information included in the MBS filter (IGMP/MLD Join filter) may include Multicast Group IP Address, List of Unicast Source IP Addresses, Access/No Access, Type (Text, Image, Video, and the like) of MBS service, QoS policy for MBS bearer traffic, and the like.

Referring to FIG. 3, a mobile terminal 110 sends a multicast control message, that is, IGMP/MLD Join message, for requesting particular MBS service to a base station 120 in step 312. The IGMP/MLD Join message includes Multicast IP Address.

The base station 120 checks/determines in step 314 success/failure in authentication on the mobile terminal 110 depending on the known information on the MBS filter. If the base station 120 determines that the authentication on the corresponding mobile terminal 110 fails, it discards the previously received IGMP/MLD Join message in step 316.

However, if the base station determines that the authentication on the corresponding mobile terminal 110 succeeds, it sets up a connection for MBS service to the mobile terminal 110 in step 318. The base station 120 sends the IGMP/MLD Join message to a serving relay station 130A in step 320. The serving relay station 130A performs in step 322 authentication on a requested MBS service in response to the IGMP/MLD Join message received from the base station 120, and sends the IGMP/MLD Join message to an anchor relay station 130B in step 330. The anchor relay station 130B performs authentication on the requested MBS service in response to the IGMP/MLD Join message received from the serving relay station 130A in step 332.

Although service authentication for MBS service has been performed by the authentication server (PF) 140 in the prior art, exemplary embodiments of the present invention allows the base station 120 to perform service authentication for MBS service, thereby contributing to minimization of a time delay caused by the service authentication and to prevention of a packet loss for the service authentication.

FIG. 4 shows the entire signaling for providing MBS service in a fixed-mobile network according to an exemplary embodiment of the present invention. It is assumed in FIG. 4 that two relay stations 130A, 130B are provided.

Referring to FIG. 4, multicast data streams associated with all MBS services transmitted from a multicast server via the Internet mobile network are propagated to a base station 120 via an anchor relay station 130B and a serving relay station 130A. The multicast data streams can be classified into data streams associated with free MBS services for which no separate accounting is performed, and data streams associated with paid MBS services for which separate accounting is performed.

The information on the QoS policy and the information on the MBS filter, provided from the authentication server (PF) 140 by the signaling of FIG. 2, are already shared in the WAN network, and can also be shared by the mobile terminal 110, if needed.

The mobile terminal 110 and the base station 120 set up a connection for transmission of a multicast control message in steps 410 to 414. That is, the base station 120 sends a DSA-REQUEST message for requesting connection setup to the mobile terminal 110 in step 410, and the mobile terminal 110 sends a DSA-RESPONSE message to the base station 120 in response to the request in step 412. The base station 120 sends a DSA-ACK message indicating completed setup of the connection for transmission of the multicast control message, to the mobile terminal 110 in step 414.

The mobile terminal 110, if it desires to receive MBS service over the set connection, sends an IGMP/MLD Join message for requesting access to a particular MBS service, to the base station 120 in step 416. The IGMP/MLD Join message includes information on a type of the desired MBS service.

The base station 120 checks/determines in step 418 success/failure in authentication on the mobile terminal 110 depending on the known information on the MBS filter. If the base station 120 determines that the authentication on the corresponding mobile terminal 110 fails, it discards the previously received IGMP/MLD Join message in step 420.

However, if the base station 120 succeeds in the authentication on the corresponding mobile terminal 110, it sends the IGMP/MLD Join message to the serving relay station in step 422. The IGMP/MLD Join message includes Multicast IP address.

The serving relay station 130A performs in step 424 authentication on a requested MBS service in response to the IGMP/MLD Join message received from the base station 120, and sends the IGMP/MLD Join message to the anchor relay station 130B in step 426. The anchor relay station 130B performs in step 428 authentication on the requested MBS service in response to the IGMP/MLD Join message received from the serving relay station 130A.

The anchor relay station 130B sends in step 430 an RR-REQUEST message for requesting connection setup for transmission of a multicast data stream, to the serving relay station 130A, and the serving relay station 130A forwards the RR-REQUEST message to the base station 120 in step 432. The base station 120 generates Multicast CID associated with a connection over which it will transmit data streams based on the corresponding MBS service. The base station 120 sends the generated Multicast CID to the mobile terminal 110 in step 434. The base station 120 forwards a RR-RESPONSE message to the serving relay station 130A in step 436 and the serving relay station 130A forwards the RR-RESPONSE message to the anchor relay station 130B in step 438. In addition, the base station 120 transmits to the mobile terminal 110 a data stream for the MBS service, service authentication of which was made successfully, among the multicast data streams received separately for individual MBS services. The multicast data stream can be transmitted by the Multicast CID previously provided to the mobile terminal 110.

As can be understood from the foregoing description, exemplary embodiments of the present invention provides QoS information for a multicast control message and a multicast bearer, and performs channel authentication on a MBS service, thereby contributing to an improvement in transmission reliability of the multicast control message and stably providing MBS service. In addition, exemplary embodiments of the present invention can perform correct accounting for the MBS service and reduce the time required for channel change.

While the invention has been shown and described with reference to a certain exemplary embodiments thereof, it will be understood by those skilled in the art that various changes in form and details may be made therein without departing from the spirit and scope of the invention as defined by the appended claims.

What is claimed is:

1. A method for providing a Multicast/Broadcast Service (MBS) to a mobile terminal in an MBS provisioning system of a Wide Area Network (WAN) network, the method comprising:

transmitting, by an authentication server, a resource reservation request message including a Quality-of-Service (QoS) policy for a multicast control message, wherein the multicast control message is used by the mobile terminal to request reception of the MBS and/or release from the MBS, and the QoS policy allows the WAN network and the mobile terminal to share a QoS policy for stably sending the multicast control message;

storing, by a base station, the resource reservation request message, and transmitting the resource reservation request message to the mobile terminal;

transmitting to the base station, by the mobile terminal, a request for channel setup based on the QoS policy;

setting up, by the mobile terminal, a channel between the mobile terminal and the base station according to a response to the request for channel setup based on the QoS policy; and transmitting to the base station, by the mobile terminal, the multicast control message for requesting reception of the MBS over the channel based on the QoS wherein the setting up comprises setting up the channel using at least one of a pre-provisioned connection-based method, a provisioning connection-based method, a dynamic connection-based method, and a Media Access Control (MAC) Layer management Connection Identifier (CID)-based method for transmitting to the base station a MAC management message that corresponds to the multicast control message, and the dynamic connection-based method is a method for setting up the dynamic connection between the mobile terminal and the base station when there is an intention to transmit the multicast control message, and releasing the dynamic connection when a reference time has elapsed and no multicast control message is transmitted during the reference time.

2. The method of claim 1, further comprising:

receiving, by a relay station, the resource reservation request message, from the authentication server, storing the resource reservation request message and transmitting the stored resource reservation request message to the base station; and transmitting the multicast control message to the base station.

3. The method of claim 1, wherein the resource reservation request message comprises at least one of a pre-provisioned QoS parameter, an Internet Group Management Protocol (IGMP)/Multicast Listener Discovery (MLD) QoS policy, and an MBS filter that includes information for handling a request for the MBS, the request for the MBS including information for requesting at least one of channel selection and channel change, wherein the IGMP/MLD QoS policy is used for stably transmitting the multicast control message, and the IGMP/MLD QoS policy includes a wireless link-level QoS provisioning method and a packet-level QoS provisioning method.

4. The method of claim 3, wherein the MBS filter is information on a type of an MBS receivable at the mobile terminal, and comprises at least one of Multicast Group Internet Protocol (1P) Address, List of Unicast Source IP Addresses, Access/No Access, Type which comprises at least one of Text, Image, and Video of MBS, and QoS Priority for MBS bearer traffic.

5. The method of claim 1, wherein the multicast control message comprises an Internet Group Management Protocol (IGMP) message and a Multicast Listener Discovery (MLD) message.

6. The method of claim 1, further comprising:
storing, by the base station, multicast data streams associated with the MBS received from a relay station;
performing, by the base station, authentication of the mobile terminal, when the multicast control message for requesting reception of the MBS is received from the mobile terminal; and
transmitting, by the base station, the multicast data streams to the mobile terminal, when the authentication is performed successfully.

7. A system for providing a Multicast/Broadcast Service (MBS) in a Wide Area Network (WAN) network, the system comprising:
an authentication server configured to transmit a resource reservation request message including a Quality-of-Service (QoS) policy for a multicast control message, wherein the multicast control message is used by the mobile terminal to request reception of the MBS and/or release from the MBS, and the QoS policy allows the WAN network and the mobile terminal to share a QoS policy for stably sending the multicast control message;
the mobile terminal configured to, upon receipt of the resource reservation request message from a base station, store the received resource reservation request message and transmit a request for channel setup to the base station based on the QoS policy when the mobile terminal desires to receive the MBS, set up a channel for transmission of the multicast control message between the mobile terminal and the base station according to a response to the request for channel setup based on the QoS policy, and transmit to the base station the multicast control message for requesting reception of the MBS over the channel based on the QoS policy; and
the base station configured to perform authentication of the mobile terminal upon receipt of the request for channel setup from the mobile terminal, and transmit multicast data streams associated with the MBS requested by the mobile terminal when the authentication is performed successfully,
wherein the channel is set up using at least one of a pre-provisioned connection-based method, a provisioning connection-based method, a dynamic connection-based method, and a Media Access Control (MAC) Layer management Connection Identifier (CID)-based method for transmitting to the base station a MAC management message that corresponds to the multicast control message, and the dynamic connection-based method is a method for setting up the dynamic connection between the mobile terminal and the base station when there is an intention to transmit the multicast control message, and releasing the dynamic connection when a reference time has elapsed and no multicast control message is transmitted during the reference time.

8. The system of claim 7, wherein the resource reservation request message comprises at least one of a pre-provisioned QoS parameter, an Internet Group Management Protocol (IGMP)/Multicast Listener Discovery (MLD) QoS policy, and an MBS filter that includes information for handling a request for the MBS, the request for the MBS including information for requesting at least one of channel selection and channel change, wherein the IGMP/MLD QoS policy is used for stably transmitting the multicast control message, and the IGMP/MLD QoS policy includes a wireless link-level QoS provisioning method and a packet-level QoS provisioning method.

9. The system of claim 7, wherein the mobile terminal comprises a controller for controlling transmission of the multicast control message to the base station over the setup channel.

10. The system of claim 7, wherein the mobile terminal sets up the channel using at least one of a pre-provisioned connection-based method, a provision connection-based method, a dynamic connection-based method, and a Media Access Control (MAC) Layer management Connection Identifier (CID)-based method for transmitting to the base station a MAC management message that corresponds to the multicast control message.

11. A method for providing a Multicast/Broadcast Service (MBS) in a Wide Area Network (WAN) network, the method comprising:
transmitting, by an authentication server, a resource reservation request message including a Quality-of-Service (QoS) policy for a multicast control message, wherein the multicast control message is used by the mobile terminal to request reception of the MBS and/or release from the MBS, and the QoS policy allows the WAN network and the mobile terminal to share a QoS policy for stably sending the multicast control message;
storing, by a base station, the resource reservation request message, and transmitting the resource reservation request message to the mobile terminal;
storing, by the mobile terminal, the resource reservation request message received from a base station;
transmitting, by the mobile terminal, a request for channel setup to the base station based on the QoS policy when the mobile terminal desires to receive the MBS;
setting up, by the mobile terminal, a channel between the mobile terminal and the base station according to a response to the request for channel setup based on the QoS policy;
transmitting to the base station, by the mobile terminal, the multicast control message for requesting reception of the MBS over the channel based on the QoS policy;
performing, by the base station, authentication of the mobile terminal upon receipt of the request for channel setup from the mobile terminal; and
transmitting, by the base station, multicast data streams associated with the MBS to the mobile terminal, when the authentication of the mobile terminal is performed successfully,
wherein the setting up comprises setting up the channel using at least one of a pre-provisioned connection-based method, a provisioning connection-based method, a dynamic connection-based method, and a Media Access Control (MAC) Layer management Connection Identifier (CID)-based method for transmitting to the base station a MAC management message that corresponds to the multicast control message, and the dynamic connection-based method is a method for setting up the dynamic connection between the mobile terminal and the base station when there is an intention to transmit the multicast control message, and releasing the dynamic connection when a reference time has elapsed and no multicast control message is transmitted during the reference time.

12. The method of claim 11, wherein the resource reservation request message comprises at least one of a pre-provisioned QoS parameter, an Internet Group Management Protocol (IGMP)/Multicast Listener Discovery (MLD) QoS policy, and an MBS filter that includes information for handling a request for the MBS, the request for the MBS including information for requesting at least one of channel selection and channel change, wherein the IGMP/MLD QoS policy is used for stably transmitting the multicast control message, and the IGMP/MLD QoS policy includes a wireless link-level QoS provisioning method and a packet-level QoS provisioning method.

13. A channel connection method of a mobile terminal for receiving a Multicast/Broadcast Service (MBS) in a Wide Area Network (WAN) network, the method comprising:

receiving, from a base station, a resource reservation request message including a Quality-of-Service (QoS) policy for a multicast control message, wherein the multicast control message is used by the mobile terminal to request reception of the MBS and/or release from the MBS, and the QoS policy allows the WAN network and the mobile terminal to share a QoS policy for stably sending the multicast control message;

storing the resource reservation request message received from the base station;

transmitting to the base station a request for channel setup based on the QoS policy, and setting up a channel between the mobile terminal and the base station for transmission of the multicast control message based on the QoS policy; and transmitting the multicast control message for requesting reception of the MBS to the base station over the channel based on the QoS policy, wherein the setting up comprises setting up the channel using at least one of a pre-provisioned connection-based method, a provisioning connection-based method, a dynamic connection-based method, and a Media Access Control (MAC) Layer management Connection Identifier (CID)-based method for transmitting to the base station a MAC management message that corresponds to the multicast control message, and the dynamic connection-based method is a method for setting up the dynamic connection between the mobile terminal and the base station when there is an intention to transmit the multicast control message, and releasing the dynamic connection when a reference time has elapsed and no multicast control message is transmitted during the reference time.

14. The channel connection method of claim 13, wherein the method further comprises:

receiving from the base station a multicast Connection Identifier (CID) used for reception of multicast data streams associated with the MBS, and receiving the multicast data streams using the multicast CID.

15. The channel connection method of claim 13, wherein the resource reservation request message is a message generated by converting a message for requesting resource reservation transmitted from an authentication server, in the base station, wherein the resource reservation request message comprises at least one of pre-provisioned QoS parameters, Internet Group Management Protocol (IGMP)/Multicast Listener Discovery (MLD) QoS policy, and MBS filter that includes information for handling a request for the MBS, the request for the MBS including information for requesting at least one of channel selection and channel change, wherein the IGMP/MLD QoS policy is used for stably transmitting the multicast control message, and the IGMP/MLD QoS policy includes a wireless link-level QoS provisioning method and a packet-level QoS provisioning method.

* * * * *